(12) United States Patent
Mital et al.

(10) Patent No.: US 11,196,500 B1
(45) Date of Patent: Dec. 7, 2021

(54) CONTINUANCE IN QUALITY LEVEL OF AN INPUT TIMING SIGNAL

(71) Applicant: Cisco Technology, Inc., San Jose, CA (US)

(72) Inventors: Bhuvan Mital, Bangalore (IN); Ashwin Kumar T.C., Bangalore (IN); Aravind Vinayak, Bangalore (IN); Rahul Gupta, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/936,624

(22) Filed: Jul. 23, 2020

(51) Int. Cl.
*H04L 7/00* (2006.01)
*H04J 3/06* (2006.01)

(52) U.S. Cl.
CPC .......... *H04J 3/0688* (2013.01); *H04J 3/0641* (2013.01); *H04J 3/0644* (2013.01); *H04J 3/0679* (2013.01)

(58) Field of Classification Search
CPC ...... H04J 3/0658; H04J 3/0679; H04J 3/0644; H04J 3/0661; H04J 3/0641; H04J 3/0664; H04J 3/0667; H04J 3/0673; H04J 2203/0085; H04J 2203/0089; H04J 3/065; H04B 7/18513; H04L 7/0008; H04L 12/422; H04L 7/0012
See application file for complete search history.

(56) References Cited

U.S. PATENT DOCUMENTS

| | | | | |
|---|---|---|---|---|
| 2012/0287948 A1* | 11/2012 | Ruffini | ................... | H04J 3/0658 370/503 |
| 2013/0039220 A1* | 2/2013 | Ruffini | ................... | H04J 3/0641 370/255 |
| 2013/0107897 A1* | 5/2013 | Bui | ....................... | H04J 3/0641 370/503 |
| 2015/0188691 A1* | 7/2015 | Mizuguchi | ......... | H04B 7/18513 375/355 |
| 2018/0242267 A1* | 8/2018 | Jiang | ..................... | H04J 3/0673 |
| 2018/0323890 A1* | 11/2018 | Zhang | ................... | H04L 12/422 |
| 2020/0177361 A1* | 6/2020 | Gareau | ............. | H04L 12/40013 |
| 2020/0322906 A1* | 10/2020 | Lv | ....................... | H04W 56/001 |

\* cited by examiner

*Primary Examiner* — Jung Liu
(74) *Attorney, Agent, or Firm* — Merchant & Gould P.C.

(57) ABSTRACT

Continuance in quality level of an input timing signal may be provided. Clock source reference timing information may be receive by a first node from a second node as an input. The first node may be downstream from the second node. Then the first node may receive an event message associated with a future event associated with the second node. The first node may then refrain, for a period of time in response to receiving the event message, from switching the input for clock source reference timing information to a source other than the second node.

20 Claims, 4 Drawing Sheets

CONTINUANCE IN QUALITY LEVEL OF AN INPUT TIMING SIGNAL

TECHNICAL FIELD

The present disclosure relates generally to input timing signaling for switching nodes.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

Switching nodes are used in communications networks to switch and route data traffic between sources and destinations. A switching node typically receives data traffic in the form of data packets on input/output (I/O) interface ports and outputs the data packets on appropriate I/O interface ports to direct the data packets to an appropriate destination in the communications network. A switching node may support multiple interface protocols and maintain multiple communication links on its interface ports with other switching nodes or other devices or networks. These devices or networks may be, for example, data storage devices, servers, local networks, or other similar communication devices.

As a switching node functions within a communications network there may be a need to perform an in-switch software upgrade/downgrade (ISSU). In order to avoid adverse effects on a switching node's communication links, the ISSU may have to be performed while the switching node remains in service in the network and while maintaining the communication links on its interface ports with neighbor switching nodes or devices. The control plane supervisor software in a switching node may maintain the communication links of the switching node by exchanging Protocol Data Units (PDUs) with neighbor nodes. Any failure of PDU exchange on a link may result in the link being brought down by link timeout at one of the communicating nodes.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
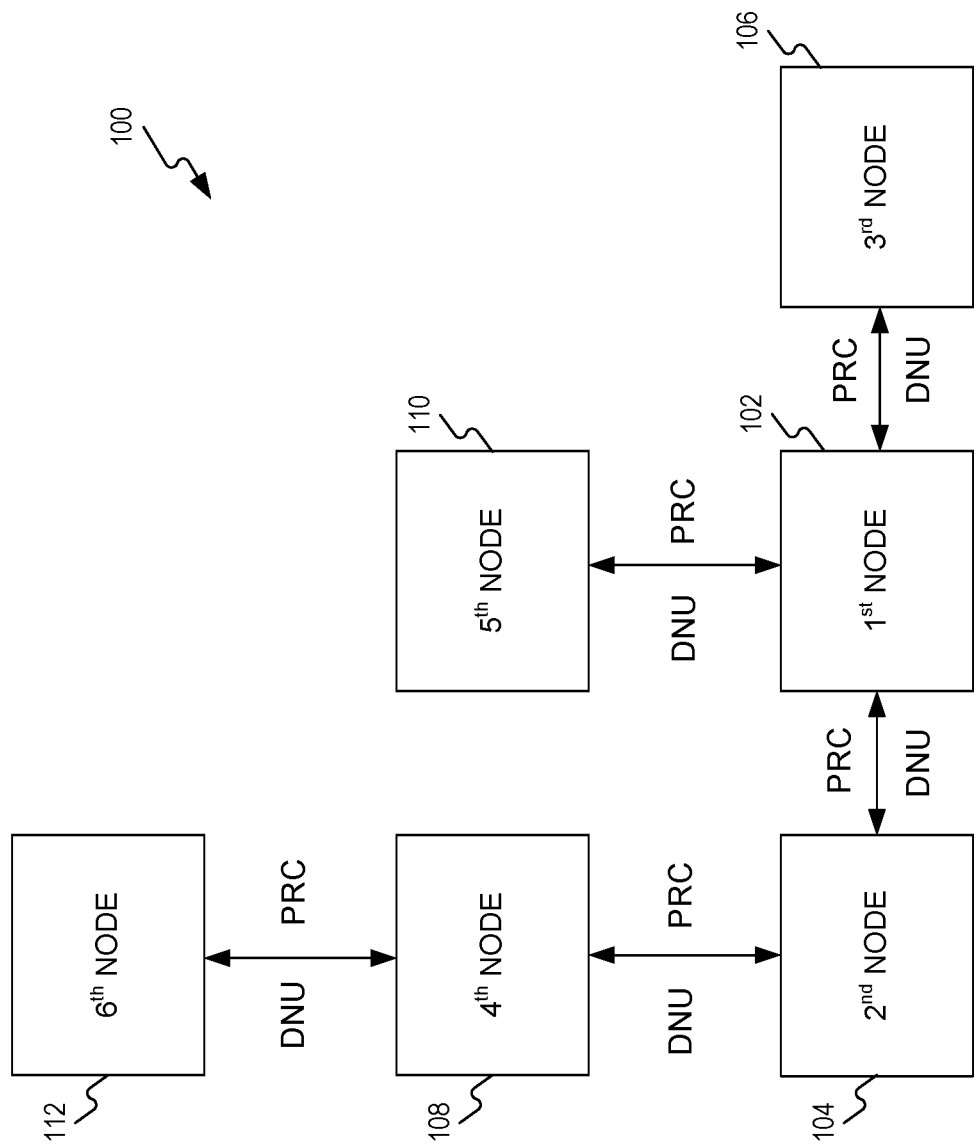
FIG. 1 is a block diagram of an operating environment for providing continuance in quality level of an input timing signal.

Continuance in quality level of an input timing signal may be provided. Clock source reference timing information may be receive by a first node from a second node as an input. The first node may be downstream from the second node. Then the first node may receive an event message associated with a future event associated with the second node. The first node may then refrain, for a period of time in response to receiving the event message, from switching the input for clock source reference timing information to a source other than the second node.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Networks may include nodes (e.g., Networking Equipment (NE). Upstream NEs may provide high Quality-Level (QL) clock source reference timing information, for example, via Ethernet Synchronization Messaging Channel (ESMC) slow Protocol Data Units (PDUs). NEs connected in a downstream path of a network comprising a Global Navigation Satellite System (GNSS)/Global Positioning System (GPS), for example, may be likely to receive high QL input values like QL-Enhanced Primary Reference Time Clock (ePRTC), QL-Primary Reference Time Clock (PRTC), or QL-Primary Reference Source (PRS) for example. These may be referred to as a Primary Reference Clock (PRC).

There may be a situation where an NE, undergoing an In-Switch Software Upgrade (ISSU), an In-Switch Software Downgrade (ISSD), a switchover, or a network event leading to system maintenance downtime, may be unable to transmit (Tx) the ESMC PDU to downstream NEs. Consequently, downstream NEs connected to the upgrading NE may see Synchronous Ethernet (SyncE) links connected to upstream NE undergo a QL value transition to QL-FAILED (e.g., after an ESMC timeout of 5 secs). Accordingly, this may trigger in the downstream NE, a new selection input and potentially switching its internal Digital Phase-Lock Loop (DPLL) input clock source to an inferior source. The inferior source may comprise, but is not limited to, a Synchronization Supply Unit (SSU) or an Ethernet equipment slave clock (EEC).

FIG. 1 shows a block diagram of an operating environment 100 for providing continuance in quality level of an input timing signal. As shown in FIG. 1, operating environment 100 may comprise a plurality of nodes (e.g., NEs). The plurality of nodes may comprise a first node 102, a second node 104, a third node 106, a fourth node 108, a fifth node 110, and a sixth node 112. Each of the plurality of nodes may comprise, but is not limited to, a switch or a router for example. As shown in FIG. 1, sixth node 112 may be upstream from fourth node 108, fourth node 108 may be upstream from second node 104, second node 104 may be upstream from first node 102, and first node 102 may be upstream from third node 106 and fifth node 110.

Upstream nodes may provide high QL clock source reference timing information, for example, via ESMC slow PDUs. Nodes connected in a downstream path of operating environment 100, for example, may be likely to receive high QL input values like ePRTC, PRTC, or PRS for example.

There may be a situation where a node (e.g., second node 104) undergoing an ISSU, ISSD, a switchover, or a network event leading to system maintenance downtime, may be unable to Tx the ESMC PDU to downstream nodes (e.g., first node 102). Consequently, downstream nodes (e.g., first node 102) connected to the upgrading node (e.g., second node 104) may see SyncE links connected to the upstream upgrading node (e.g., second node 104) undergo a QL value transition to QL-FAILED (e.g., after an ESMC timeout of 5 secs). Accordingly, this may trigger in the downstream node (e.g., first node 102), a new selection input (e.g., reselection) and potentially switching its internal Digital Phase-Lock Loop (DPLL) input clock source to an inferior source (e.g., SSU or EEC). However, with embodiments of the disclosure, this input clock source switching may be avoided. For example, embodiments of the disclosure may avoid SyncE source re-selection by extending an ESMC Rx timer on the downstream NE (e.g., first node 102). Increasing the ESMC Rx timer may ensure that selection is not re-triggered and QL value modification to QL-FAILED (due to ESMC timeout) does not occur while the upstream upgrading node (e.g., second node 104) is going thru an upgrade.

The elements described above of operating environment 100 (e.g., first node 102, second node 104, third node 106, fourth node 108, fifth node 110, and sixth node 112) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

Figure 2:
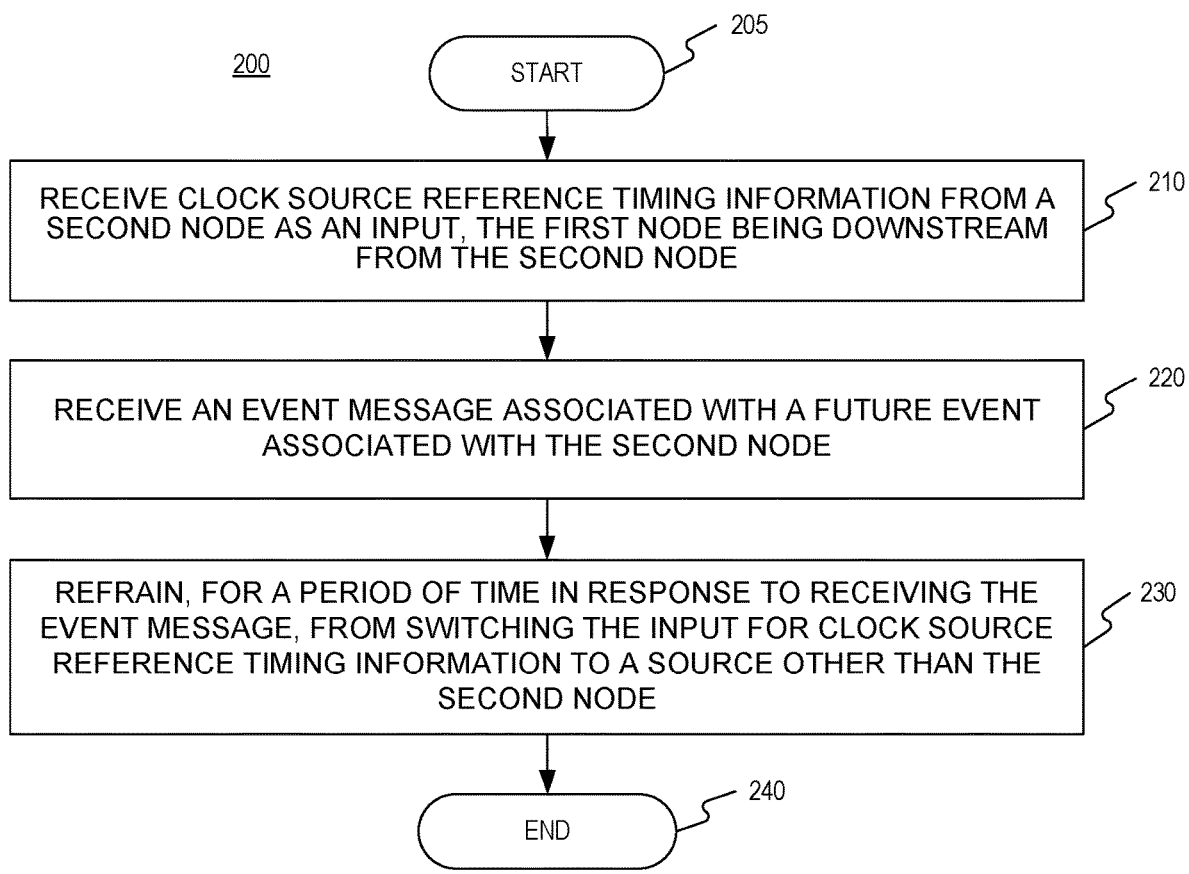
FIG. 2 is a flow chart of a method for providing continuance in quality level of an input timing signal.

FIG. 2 is a flow chart setting forth the general stages involved in a method 200 consistent with an embodiment of the disclosure for providing continuance in quality level of an input timing signal. Method 200 may be implemented using first node 102 as described in more detail above with respect to FIG. 1. Ways to implement the stages of method 200 will be described in greater detail below.

Method 200 may begin at starting block 205 and proceed to stage 210 where first node 102 may receive clock source reference timing information from second node 104 as an input. First node 102 may being downstream from second node 104. For example, clock synchronization may be a feature among the plurality of nodes in FIG. 1. When the plurality of nodes synchronize, they may receive clock source reference timing information to synchronize their frequency to a higher quality clock (e.g., Primary Reference Clock (PRC)), which may be upstream of the plurality of node as shown in FIG. 1. It may be a goal of operating environment 100 to synchronize the plurality of nodes to the highest quality clock that is available. When a node synchronizes its clock to the highest quality clock in the upstream, the same happens downstream where the clocks also synchronize to the highest quality clock. So all of the plurality of node shown in FIG. 1 may synchronize with each other, for example, to the PRC.

From stage 210, where first node 102 receives clock source reference timing information from second node 104 as an input, method 200 may advance to stage 220 where first node 102 may receive an event message associated with a future event associated with second node 104. The future event associated with second node 104 may comprise, but is not limited to, an ISSU, ISSD, a switchover, or a network event leading to system maintenance downtime. For example, the plurality of nodes in operating environment 100 may be communicating via a control plane protocol (e.g., via ESMC slow PDUs). When any of the plurality of nodes in operating environment 100 goes down, for example to be upgraded, the synchronization chain may be broken in operating environment 100 at the down node and downstream from the down node. For example, if second node 104 goes down to be upgraded, first node 102 may no longer receive ESMC slow PDUs from second node 104 and thus first node 102 may lose synchronization with the higher quality clock (e.g., PRC). Also, because first node 102 may lose synchronization with the higher quality clock, third node 106 and fifth node 110, being downstream from first node 102, may no longer receive ESMC slow PDUs from first node 102 and thus may also, lose synchronization with the higher quality clock.

Because they may have lost synchronization with the higher quality clock (e.g., PRC), first node 102, third node 106, and fifth node 110 may have to switch to an inferior source comprising, but not limited to, a Synchronization Supply Unit (SSU) or an Ethernet equipment slave clock (EEC). In other words, second node 104 undergoing, for example, an ISSU, ISSD, a switchover, or a network event leading to system maintenance downtime, may be unable to transmit the ESMC PDU to downstream nodes (e.g., first node 102). Consequently, first node 102 being connected to the upgrading node (e.g., second node 104) may see SyncE links connected to the upstream upgrading node (e.g., second node 104) undergo a QL value transition to QL-FAILED (e.g., after an ESMC timeout of 5 secs). Accordingly, this may trigger in the downstream node (e.g., first node 102), a new selection input (e.g., reselection) and potentially switching its internal DPLL input clock source to an inferior source (e.g., SSU or EEC).

Once first node 102 receives the event message associated with the future event associated with second node 104 in stage 220, method 200 may continue to stage 230 where first node 102 may refrain, for a period of time in response to receiving the event message, from switching the input for clock source reference timing information to a source other than second node 104. For example, even though second node 104 may be down for an upgrade, first node 102 and second node 104 may still be physically attached and thus first node 102 may still have access through the physical attachment to the higher quality clock (e.g., PRC) signal from second node 104. Accordingly, first node 102, third node 106, and fifth node 110 may not necessarily have to switch to the inferior source while second node 104 is down. In other words, with embodiments of the disclosure, this input clock source switching may be avoided. For example, embodiments of the disclosure may avoid SyncE source re-selection by extending the ESMC receive timer on the downstream nodes (e.g., first node 102). Increasing the ESMC Rx timer may ensure that selection is not re-triggered and QL value modification to QL-FAILED (due to ESMC timeout) does not occur while the upstream upgrading node (e.g., second node 104) is going thru an upgrade.

Figure 3:
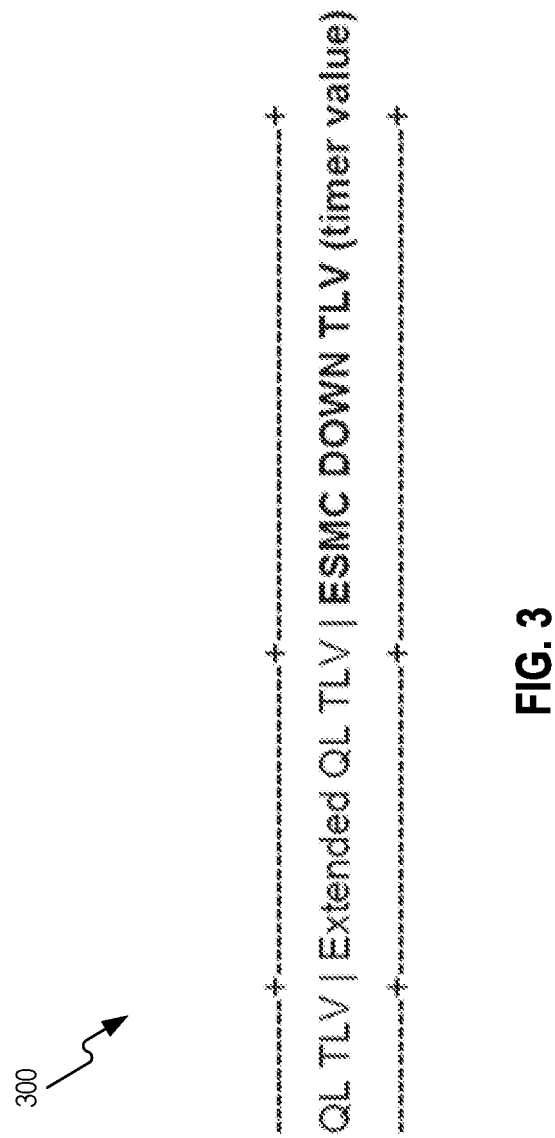
FIG. 3 illustrates an Ethernet Synchronization Messaging Channel (ESMC) down Type Length Value (TLV)

FIG. 3 illustrates an Ethernet Synchronization Messaging Channel (ESMC) down Type Length Value (TLV) 300 that may comprise the event message associated with the future event associated with second node 104. As shown in FIG. 3, the ESMC frame may be augmented with an ESMC DOWN TLV (in case of an ESMC-Down/Upgrade event). The ESMC DOWN TLV may indicate the period of time first node 102 may refrain from switching the input for clock source reference timing information to a source other than second node 104. The ESMC Rx timer may be made platform specific by encoding the timeout value in the ESMC DOWN TLV, so that the upgrading node (e.g., second node 104) may have full control on the time for which it expects the downstream node (e.g., first node 102) to hold the source signal (e.g., based on second node 104's down-time heuristics).

Consistent with embodiments of the disclosure, first node 102 may recover or fall back to normal ESMC protocol when it receives normal ESMC packets without the extended TLV (e.g., the ESMC DOWN TLV) before timer expiry or timer expiry is the trigger for the downstream node to fall back to normal ESMC processing. Furthermore, during the upgrade (when the timer is active) if a link goes bad, then this may be detected by the DPLL (of first node 102) and selection may switch to the next best source available. Once first node 102 refrains, for the period of time in response to receiving the event message, from switching the input for clock source reference timing information to the source other than second node 104 in stage 230, method 200 may then end at stage 240.

Figure 4:
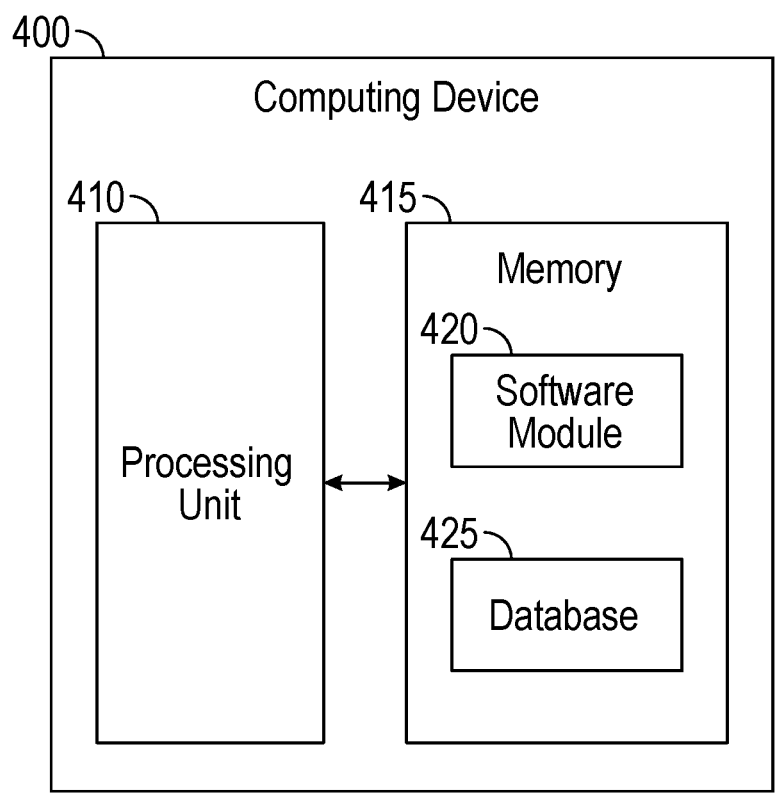
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing continuance in quality level of an input timing signal as described above with respect to FIG. 2. Computing device 400, for example, may provide an operating environment for first node 102, second node 104, third node 106, fourth node 108, fifth node 110, and sixth node 112. First node 102, second node 104, third node 106, fourth node 108, fifth node 110, and sixth node 112 may operate in other environments and are not limited to computing device 400.

Computing device 400 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, by a first node, clock source reference timing information from a second node as an input, the first node being downstream from the second node;
   receiving, by the first node, an event message associated with a future event associated with the second node; and
   refraining, by the first node for a period of time in response to receiving the event message associated with the future event associated with the second node, from switching an input for the clock source reference timing information to a source other than the second node, wherein refraining, by the first node for the period of time in response to receiving the event message associated with the future event associated with the second node, from switching the input for the clock source reference timing information to the source other than the second node comprises extending the source re-selection by a time value.

2. The method of claim 1, wherein receiving the event message comprises receiving the event message from the second node.

3. The method of claim 1, wherein receiving the event message comprises receiving the event message including the time value wherein the period of time is based on the time value.

4. The method of claim 3, wherein the time value is determined by the second node.

5. The method of claim 1, wherein receiving the event message comprises receiving the event message including the time value wherein the period of time is equal to the time value.

6. The method of claim 5, wherein the time value is determined by the second node.

7. The method of claim 1, wherein refraining for the period of time comprises refraining for the period of time comprising one of the following: being equal to an amount of time needed for the second node to recover from the future event and being greater than the amount of time needed for the second node to recover from the future event.

8. The method of claim 1, wherein receiving the event message associated with the future event comprises receiving the event message associated with the future event comprising one of the following: an upgrade of the second node; a control plane being down; and a system switchover.

9. An apparatus comprising:
   a memory storage; and
   a processing unit coupled to the memory storage and disposed in a first node, wherein the processing unit is operative to:
      receive clock source reference timing information from a second node as an input, the first node being downstream from the second node;
      receive an event message associated with a future event associated with the second node; and
      refrain, for a period of time in response to receiving the event message associated with the future event associated with the second node, from switching the input for clock source reference timing information to a source other than the second node, wherein refraining, by the first node for the period of time in response to receiving the event message associated with the future event associated with the second node, from switching the input for the clock source reference timing information to the source other than the second node comprises extending the source re-selection by a time value.

10. The apparatus of claim 9, wherein the processing unit being operative to receive the event message comprises the processing unit being operative to receive the event message from the second node.

11. The apparatus of claim 9, wherein the event message includes the time value wherein the period of time is based on the time value.

12. The apparatus of claim 11, wherein the time value is determined by the second node.

13. The apparatus of claim 9, wherein the event message includes the time value wherein the period of time is equal to the time value.

14. The apparatus of claim 13, wherein the time value is determined by the second node.

15. The apparatus of claim 9, wherein the processing unit being operative to refrain for the period of time comprises the processing unit being operative to refrain for the period of time comprising one of the following: being equal to an amount of time needed for the second node to recover from the future event and being greater than the amount of time needed for the second node to recover from the future event.

16. The apparatus of claim 9, wherein the future event comprising one of the following: an upgrade of the second node; a control plane being down; and a system switchover.

17. A non-transitory computer-readable medium that stores a set of instructions which when executed perform a method comprising:

receiving, by a first node, clock source reference timing information from a second node as an input, the first node being downstream from the second node;

receiving, by the first node, an event message associated with a future event associated with the second node; and refraining, by the first node for a period of time in response to receiving the event message associated with the future event associated with the second node, from switching an input for the clock source reference timing information to a source other than the second node, wherein refraining, by the first node for the period of time in response to receiving the event message associated with the future event associated with the second node, from switching the input for the clock source reference timing information to the source other than the second node comprises extending the source re-selection by a time value.

18. The non-transitory computer-readable medium of claim 17, wherein receiving the event message comprises receiving the event message including the time value wherein the period of time is based on the time value.

19. The non-transitory computer-readable medium of claim 17, wherein receiving the event message comprises receiving the event message including the time value wherein the period of time is equal to the time value.

20. The non-transitory computer-readable medium of claim 17, wherein refraining for the period of time comprises refraining for the period of time comprising one of the following: being equal to an amount of time needed for the second node to recover from the future event and being greater than the amount of time needed for the second node to recover from the future event.

* * * * *